United States Patent [19]
Bruehl

[11] Patent Number: 6,123,351
[45] Date of Patent: Sep. 26, 2000

[54] INDEPENDENT WHEEL SUSPENSION HAVING A WHEEL CARRIER SUPPORTED BY WAY OF A COUPLING ROD ON AN INDIVIDUAL CONTROL ARM

[75] Inventor: Hubert Bruehl, Waldstetten, Germany

[73] Assignee: DaimlerChrysler AG, Stuttgart, Germany

[21] Appl. No.: 09/213,235

[22] Filed: Dec. 17, 1998

[30] Foreign Application Priority Data

Dec. 17, 1997 [DE] Germany .......................... 197 56 064

[51] Int. Cl.[7] .................................................. B60G 7/00
[52] U.S. Cl. .................................................. 280/124.135
[58] Field of Search ..................... 280/124.135, 124.136, 280/124.138, 124.139, 124.141, 124.142, 124.134, FOR 126, 93.512, 104, 124.145; 180/409

[56] References Cited

U.S. PATENT DOCUMENTS

| | | | |
|---|---|---|---|
| 4,556,238 | 12/1985 | Matschinsky | 280/124.135 |
| 4,819,959 | 4/1989 | Inoue et al. | 280/93.512 |
| 4,842,296 | 6/1989 | Kubo | 280/124.136 |
| 4,978,131 | 12/1990 | Edahiro et al. | 280/91 |
| 5,496,055 | 3/1996 | Shibahata et al. | 280/665 |

*Primary Examiner*—Brian L. Johnson
*Assistant Examiner*—Gerald Klebe
*Attorney, Agent, or Firm*—Evenson, McKeown, Edwards & Lenahan, P.L.L.C.

[57] ABSTRACT

An independent wheel suspension for front wheels of a motor vehicle, having a wheel carrier which can be swivelled for steering purposes. A lower end of the wheel carrier is disposed on a lower control arm. An upper area of the wheel carrier is supported, on the one hand, by way of a coupling rod, on this lower control arm and, on the other hand, by way of an upper control arm, on the vehicle body. Instead of the semi-trailing arm known from the prior art, the independent wheel suspension has two separate individual control arms. At least in the projection onto the road (i.e., a horizontal plane), the lines of influence of these two control arms form a triangle corresponding to a transverse link or semi-trailing arm. The theoretical steering axis is either intersected or crossed by the lines of influence. The two control arms end spatially in front of the theoretical steering axis in two separate adjacent hinge points on the wheel carrier. The independent wheel suspension minimizes the number of vehicle-body-side linking points while leaving sufficient space for a large-dimensioned wheel-side braking system.

7 Claims, 4 Drawing Sheets

INDEPENDENT WHEEL SUSPENSION HAVING A WHEEL CARRIER SUPPORTED BY WAY OF A COUPLING ROD ON AN INDIVIDUAL CONTROL ARM

This application claims the priority of German patent 197 56 064.4, filed Dec. 17, 1997, the disclosure of which is expressly incorporated by reference herein.

BACKGROUND AND SUMMARY OF THE INVENTION

The invention relates to an independent wheel suspension for front wheels of a motor vehicle, having a wheel carrier which can be swivelled for steering purposes. A lower end of the wheel carrier is disposed on a lower control arm. An upper area of the wheel carrier is supported, on the one hand, by a coupling rod, on the lower control arm and, on the other hand, by an upper control arm, on the vehicle body.

From German Patent Document DE 26 42 939, a space-saving independent wheel suspension is known for a steerable motor vehicle wheel, in the case of which the wheel carrier is linked at three points to the vehicle body by way of a lower semi-trailing arm and an upper bar-type control arm. The wheel carrier is supported by way of a coupling rod on the semi-trailing arm. The hinge points between the wheel carrier and the two control arms are situated on the steering or spreading axis. This limits the space for the wheel-side braking device.

An object of the present invention is to provide an independent wheel suspension which, while the number of linking points on the vehicle body side is as low as possible, leaves sufficient space for a large-dimensioned wheel-side braking device.

This and other objects have been achieved by providing an independent wheel suspension for a motor vehicle, comprising: a steerable wheel carrier swivellable with respect to a theoretical steering axis; a pair of lower control arms coupled to a lower area of said wheel carrier at separate hinge points; an upper control arm coupled to an upper portion of said wheel carrier; and a coupling rod extending between an upper area of said wheel carrier and one of the lower control arms, said pair of lower control arms defining lines of influence which when projected onto a horizontal plane form a triangle, each of said lines of influence intersecting said theoretical steering axis or crossing proximate thereto, said lower control arms ending at a distance from said theoretical steering axis at said separate hinge points on said wheel carrier.

Instead of the semi-trailing arm known from the prior art, this new independent wheel suspension contains two separate, for example, bar-shaped, control arms. At least in the projection onto the road, the lines of influence of these two control arms form a triangle corresponding to a transverse link or semi-trailing arm. The theoretical steering axis is either intersected or crossed by the lines of influence. The two control arms end spatially in front of the theoretical steering axis in two separate adjacent hinge points on the wheel carrier.

In the case of this further development of the known "antisquat rear suspension principle" for a four-control-arm axis, the steering axis on the wheel can be selected freely so that a large-dimensioned braking device also has sufficient space in the rim area. The important axis-kinematic parameters, such as the steering offset, the gap radius or the caster offset can be selected freely despite the limited space conditions. By dividing the lower control arm into two individual control arms and the linking of the coupling rod to or close to the line of influence of a lower control arm, a momentary steering axis is obtained for the wheel which extends at least approximately through the intersecting point or crossing point of the lines of influence of the lower individual control arms.

Since at least the lower control arms end spatially in front of the steering axis, a large clearance is obtained between the rim bowl of the steered wheel and the wheel carrier, which clearance can be utilized, for example, for a wheel-side braking device.

Other objects, advantages and novel features of the present invention will become apparent from the following detailed description of the invention when considered in conjunction with the accompanying drawings.

DETAILED DESCRIPTION OF THE DRAWINGS

Figure 1:
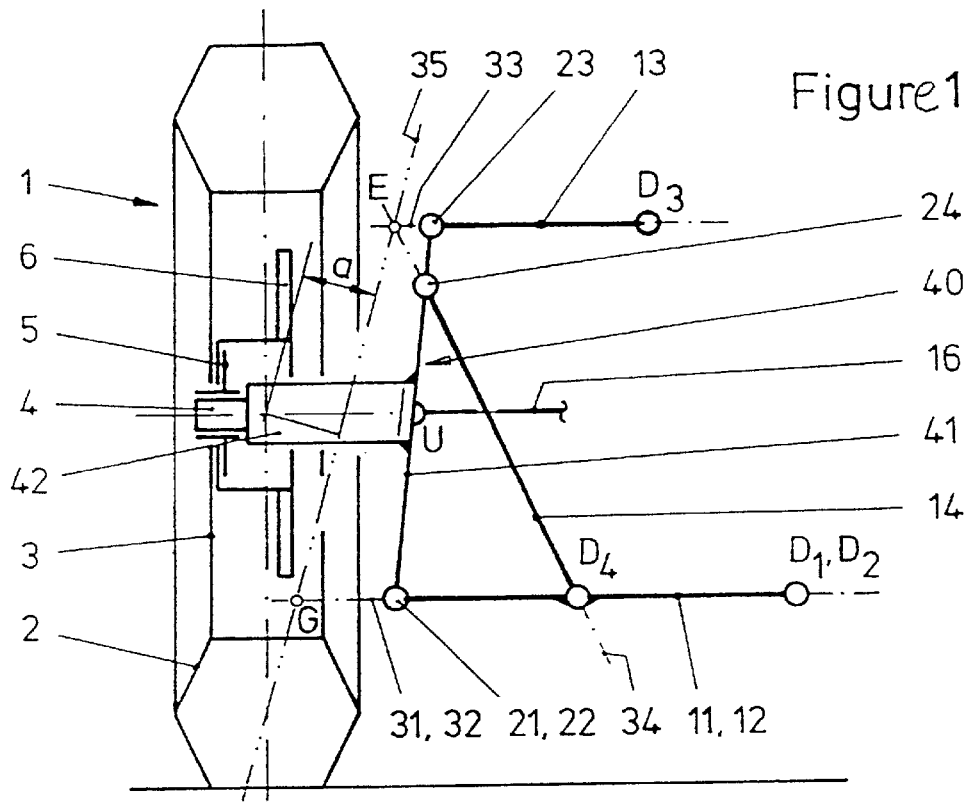
FIG. 1 is a rear view of an independent wheel suspension with two lower control arms situated in one plane according to a preferred embodiment of the present invention.
Figure 2:
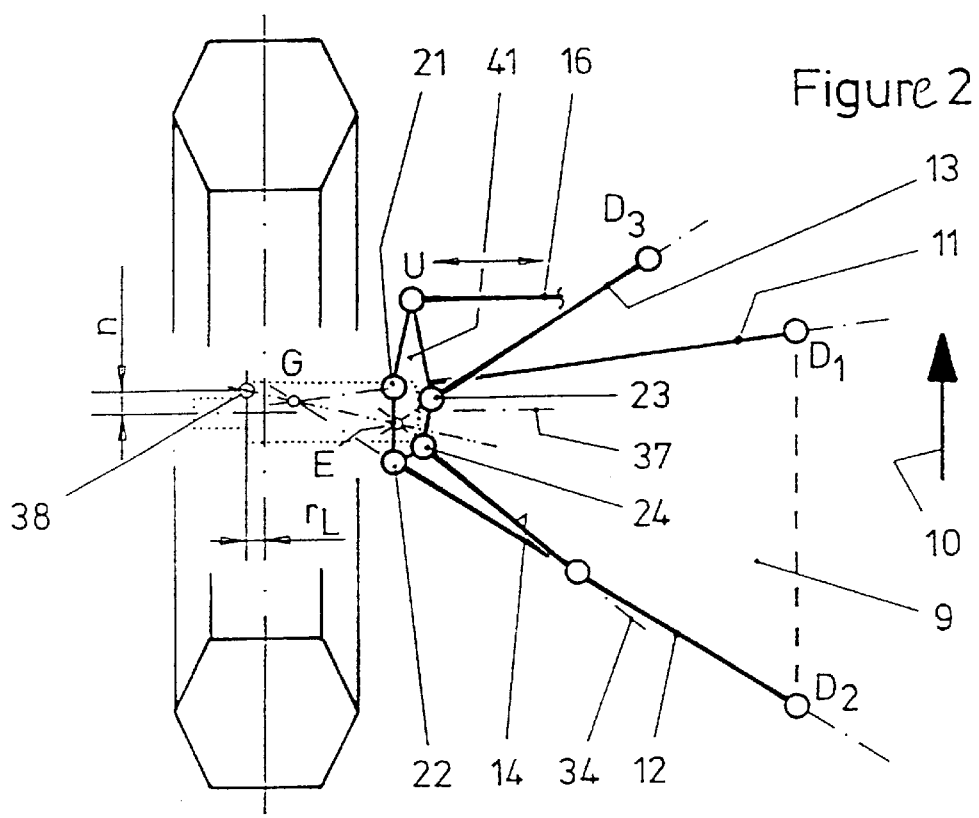
FIG. 2 is a top view of FIG. 1.
Figure 3:
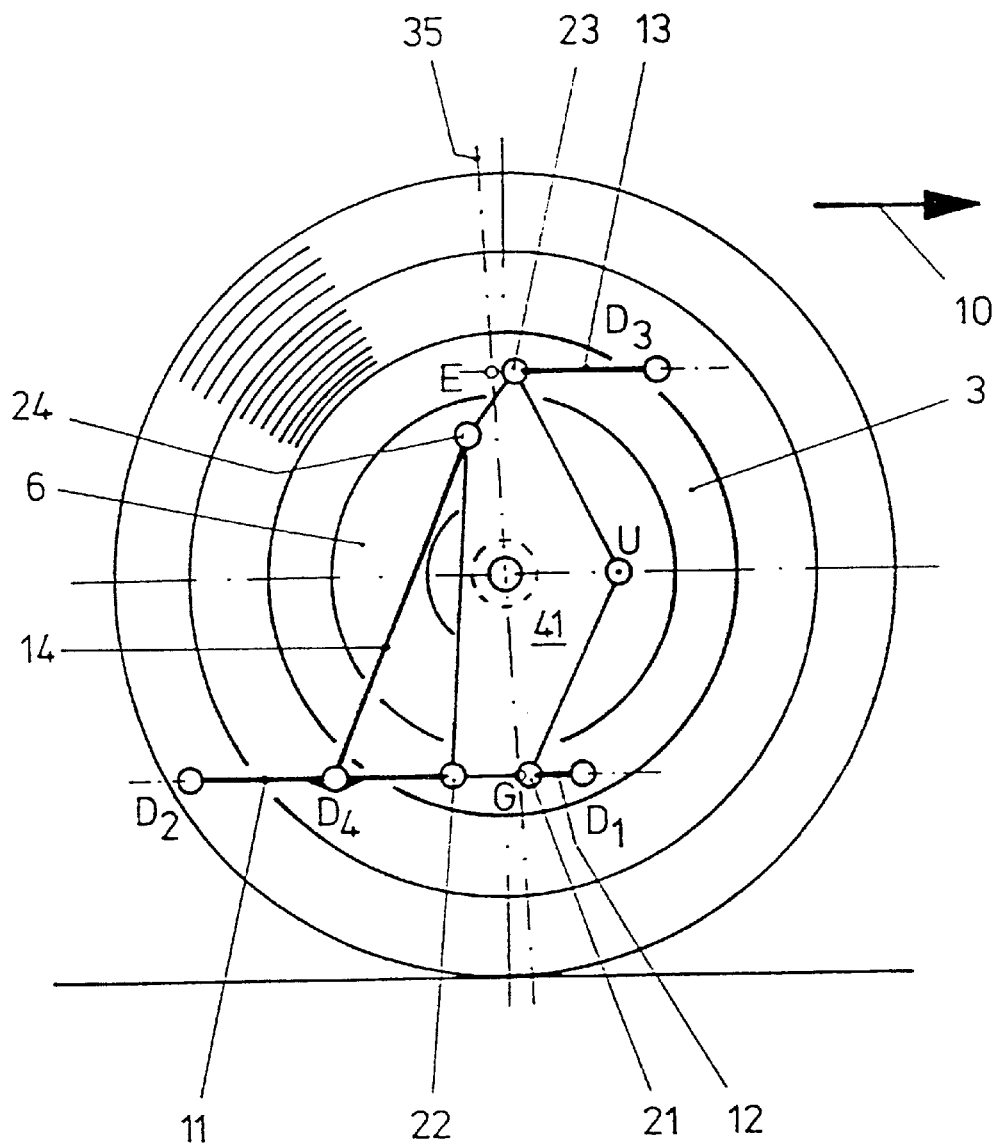
FIG. 3 is a lateral view of FIG. 1.

FIGS. 1 to 3 are three views of an independent wheel suspension for a motor vehicle wheel 1 which can, for example, be driven and steered. The wheel 1, which has a rim 3 and a tire 2, is disposed on a swivellable wheel carrier 40. A drive shaft stub 4 is disposed by way of a roller bearing in the wheel carrier 40 and, as a rule, is part of a constant-velocity slide joint which is not shown here. A wheel hub 5, which carries a brake disk 6 and the wheel 1, is disposed in a non-rotatable manner on the drive shaft stub 4.

The wheel carrier 40, which is generally star-shaped, is shown here in a simplified manner as a flat five-cornered plate 41 with a molded-on cylindrical axle journal tube 42. The corners of the plate 41 are the hinge points (21–24, U).

The wheel carrier 40 is linked to the vehicle body via four control arms 11–13, 16 at the linking points ($D_1$–$D_3$) The linking point for the fourth control arm—the tie rod section 16—is not shown.

The two lower control arms 11 and 12, which end on the wheel carrier 40 in the hinge points 21 and 22, are situated, for example, in a plane which is parallel to the road. In this case, the lines of influence 31 and 32 of the control arms 11, 12 form the legs of a triangle 9 whose wheel-side point (i.e., vertex defined by projections of control arms 11, 12) is ideally located on or in the proximity of the momentary steering axis 35. The projections of the lower individual control arms 11, 12 and the steering axis 35 intersect in the figures at point (G), as shown in FIG. 2. Dependent on the constructive embodiment, the lines of influence 31 and 32 intersect the momentary steering axis 35 in the area of point (G). In this case, instead of intersecting, the lines of influence 31 and 32 may only cross one another.

In the illustrated embodiment, the monentary steering axis 35 intersects the wheel contact area outside its center at point 38, as shown in FIG. 2. Viewed in the driving direction 10, this point is situated by the caster offset "n" in front of the center. In addition, it is offset by the negative steering offset "$r_L$" with respect to the center. Reference character "a" in FIG. 1 denotes the gap radius of the steering force lever arm.

A coupling rod 14 is arranged between the rearward control arm 11 and the wheel carrier 40 in a hinged manner. For this purpose, the coupling rod 14 is disposed on the control arm 11 at a linking point ($D_4$) and on the wheel carrier 40 at the hinge point 24. It supports the wheel carrier 40 with respect to the control arm 12. The hinge point 24 and the linking point ($D_4$), together with the hinge point 22 situated on the wheel carrier 40, form a triangle which is part of a plane in which, at least in this embodiment of FIGS. 1 to 3, the theoretical steering axis 35 is situated.

Above the horizontal wheel center plane, a third control arm 13 is arranged between the vehicle body and the wheel carrier 40. The upper control arm 13 is supported on the vehicle body side at the linking point ($D_3$). On the wheel carrier 40, the upper control arm 13 is disposed at the hinge point 23. For supporting the positive and negative acceleration forces, the linking point ($D_3$) is offset with respect to the hinge point 23 toward the front (i.e., toward the vehicle front).

The line of influence 33 of the, for example, approximately horizontally aligned control arm 13 intersects or crosses the theoretical steering axis 35 in the area of point (E). In FIGS. 1 to 5, the control arm 13 spatially ends in front of point (E). However, since sufficient space is available here, the wheel suspension may also be constructed such that the control arm 13 ends on the steering axis 35. Irrespective thereof, the line of influence 33 intersects the plane established by the points or the hinge points or linking points 22, 24 and ($D_4$). Optionally, the intersection point, as for example, point (E) in FIG. 2, is situated on the theoretical steering axis 35.

The hinge point (U) is arranged on the wheel carrier 40, for example, in the area in front of the wheel center line 37. The hinge point (U) represents the end of the steering arm which is integrated here in the plate 41. For example, an axially parallel tie rod section 16 is disposed at hinge point (U) in a hinged manner.

Figure 4:
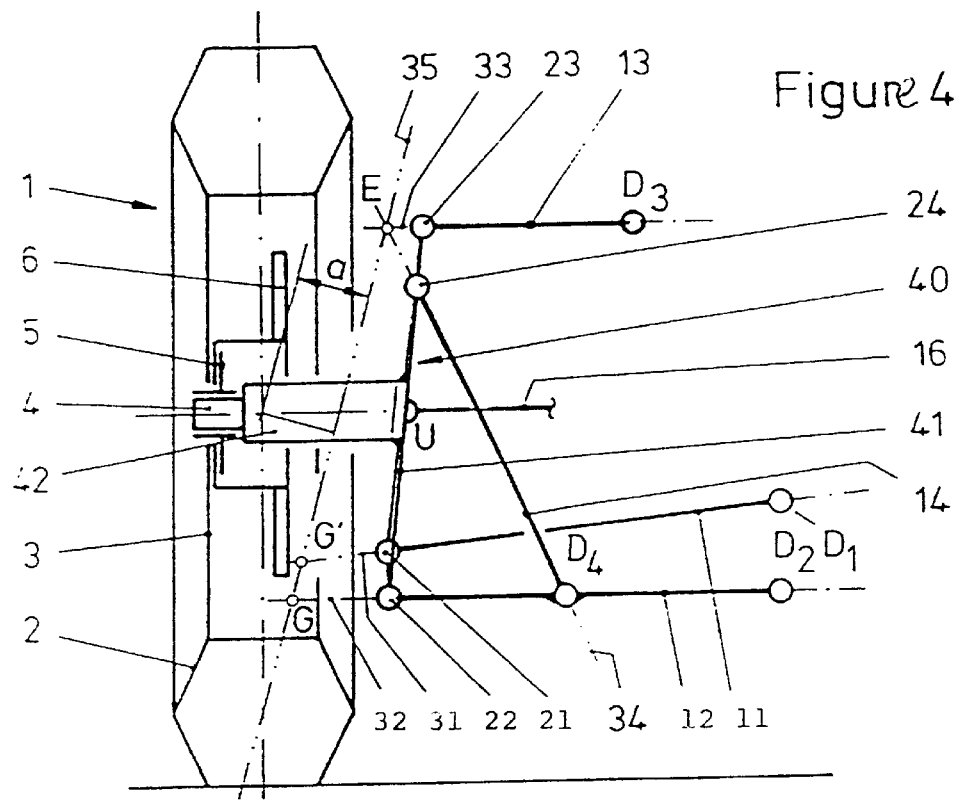
FIG. 4 is a rear view of an independent wheel suspension with two lower control arms situated in different planes.
Figure 5:
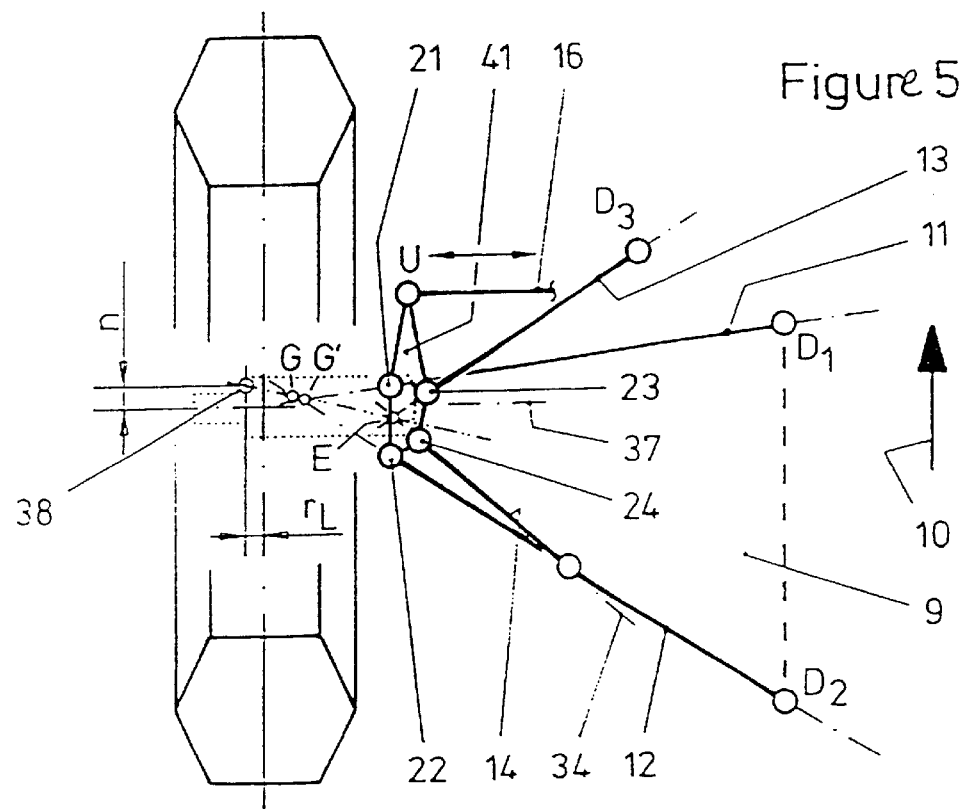
FIG. 5 is a top view of FIG. 4.

FIGS. 4 and 5 illustrate an independent wheel suspension, in the case of which the lines of influence 31 and 32 of the lower control arms 11 and 12 are situated in different, mutually intersecting planes. As shown in FIG. 4, the forward control arm 11 is situated higher than the rearward control arm 12 and is sloped downward toward the wheel. Its line of influence 31 intersects the theoretical steering axis 35 at point (G').

The planes, in which the lines of influence 31 and 32 are situated, may optionally also be aligned in parallel.

Figure 6:
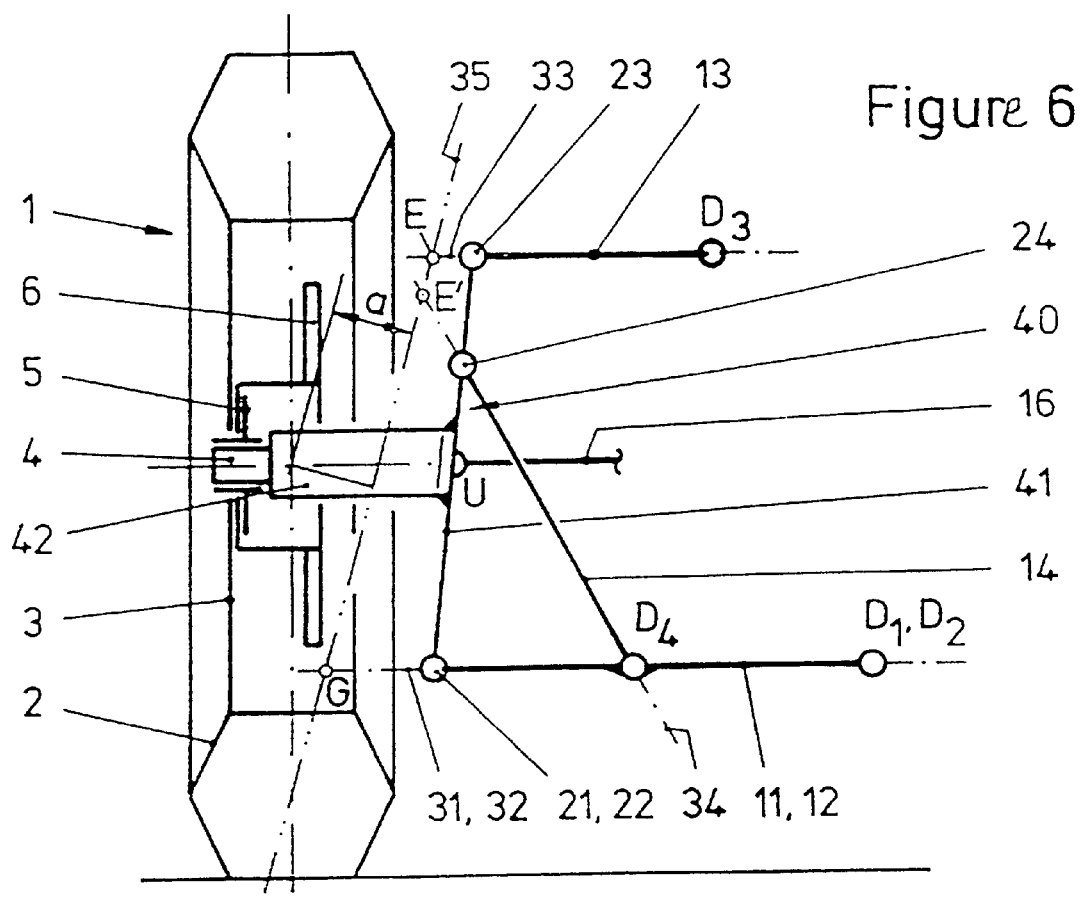
FIG. 6 is a rear view of an independent wheel suspension in the case of which the lines of influence of the upper control arm and of the coupling rod do not intersect on the steering axis.

FIG. 6 illustrates an independent wheel suspension in the case of which the line of influence 33 of the upper control arm 13 and the line of influence 34 of the coupling rod 14 intersect the steering axis 35 in different points (E) and (E'). Here, point (E') is situated below point (E).

The independent wheel suspension is supported on the vehicle body with a conventional vehicle spring, and a known shock absorber or a spring strut, not shown. The support of the spring and the shock absorber or the spring strut on the independent wheel suspension takes place, for example, on the forward lower control arm 11. In an independent wheel suspension with a driven vehicle wheel, the linking points on the control arm 11 are selected such that the driving drive shaft has the required moving space. Optionally, an intermediate element is arranged between the control arm and the spring elements and/or shock absorber elements, which intermediate element the moving space of the drive shaft is bypassed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An independent wheel suspension for a motor vehicle, comprising:

a steerable wheel carrier swivellable with respect to a momentary steering axis;

a pair of lower control arms coupled to a lower area of said wheel carrier at separate hinge points;

an upper control arm coupled to an upper portion of said wheel carrier; and a coupling rod extending between an upper area of said wheel carrier and one of the lower control arms, said pair of lower control arms defining lines of influence projectable onto a horizontal plane to form a triangle, each of said lines of influence crossing at least proximate to said momentary steering axis, said lower control arms ending at a distance from said momentary steering axis at said separate hinge points on said wheel carrier.

2. An independent wheel suspension according to claim 1, wherein said pair of lower control arms defines one of a transverse link and semi-trailing arm.

3. An independent wheel suspension according to claim 1, wherein said upper control arm defines a line of influence which intersects said theoretical steering axis at a point or crosses proximate thereto, said upper control arm ending at a distance from said point at a hinge point on the wheel carrier.

4. An independent wheel suspension according to claim 1, wherein said coupling rod defines a line of influence which intersects said theoretical steering axis at a point or crosses proximate thereto, said upper control arm ending at a distance from said point at a hinge point on the wheel carrier.

5. An independent wheel suspension according to claim 1, wherein said coupling rod is supported on or proximate said line of influence of said one of the lower control arms.

6. An independent wheel suspension according to claim 3, wherein said coupling rod is supported on or proximate said line of influence of said one of the lower control arms.

7. An independent wheel suspension according to claim 4, wherein said coupling rod is supported on or proximate said line of influence of said one of the lower control arms.

* * * * *